United States Patent [19]

Maathuis et al.

[11] Patent Number: 4,498,514
[45] Date of Patent: Feb. 12, 1985

[54] REINFORCING BELT FOR TIRES WITH RADIAL CASING

[75] Inventors: Antonnis G. Maathuis, Fouhren; Anthony W. Parsons, Schieren, both of Luxembourg

[73] Assignee: The Goodyear Tire & Rubber Company, Akron, Ohio

[21] Appl. No.: 468,255

[22] Filed: Feb. 22, 1983

[30] Foreign Application Priority Data

Feb. 26, 1982 [LU] Luxembourg .............................. 83980

[51] Int. Cl.³ .............................. B60C 9/20; B60C 9/08
[52] U.S. Cl. .................................. 152/356 R; 152/359; 152/361 DM
[58] Field of Search ........ 152/361 R, 361 DM, 354 R, 152/356 R, 330 R, 355, 359, 374, 209 R

[56] References Cited

U.S. PATENT DOCUMENTS

| 3,386,487 | 6/1968 | Massoubre | 152/361 DM |
| 3,667,529 | 6/1972 | Mirtain | 152/361 DM |
| 3,786,851 | 1/1974 | Mirtain et al. | 152/361 DM |
| 3,850,219 | 11/1974 | Snyder | 152/361 DM |
| 3,960,628 | 6/1976 | Snyder | 156/123 |
| 4,196,764 | 4/1980 | Skidmore | 152/361 R |
| 4,258,775 | 3/1981 | Samoto | 152/361 R |
| 4,277,296 | 7/1981 | Skidmore | 152/361 R X |

FOREIGN PATENT DOCUMENTS

| 650915 | 1/1965 | Belgium . |
| 776102 | 4/1972 | Belgium . |
| 1253395 | 5/1961 | France . |
| 1258886 | 8/1961 | France . |
| 1437569 | 7/1966 | France . |
| 1499072 | 10/1967 | France . |
| 1586370 | 2/1970 | France . |
| 2369925 | 6/1978 | France . |
| 2417406 | 9/1979 | France . |
| 2499473 | 8/1982 | France . |
| 76739 | 6/1977 | Luxembourg . |
| 1389252 | 4/1975 | United Kingdom . |
| 1410035 | 10/1975 | United Kingdom . |
| 2016381A | 9/1979 | United Kingdom . |
| 2017019 | 10/1979 | United Kingdom . |
| 1575027 | 9/1980 | United Kingdom . |
| 1577627 | 10/1980 | United Kingdom . |
| 2064445A | 6/1981 | United Kingdom . |

Primary Examiner—William A. Powell
Assistant Examiner—Thomas Bokan
Attorney, Agent, or Firm—L. R. Drayer

[57] ABSTRACT

A radial tire has improved performance and durability because of a layer of textile cords between the belt and the tread and strips of textile cord between and near the edges of the belt plies.

4 Claims, 4 Drawing Figures

REINFORCING BELT FOR TIRES WITH RADIAL CASING

This invention relates to a belt package for pneumatic radial vehicle tires. More particularly it relates to a belt package incorporating bands of textile cords in the region of the belt ply edges.

Tires having belt packages are well known in the art. Efforts continue to improve the performance and durability of such tires.

The present invention relates to a tire with a radial carcass comprising a belt posed between the carcass and the tread and comprised of two crossed layers of wires or cords of width $L_1$ and width $L_2$ respectively, forming an angle of 15° to 35° with the circumferential direction of the tire, characterized in that the belt is covered by a layer of textile cords of axial width $L_4$ that is at least equal to the width $L_2$ of the radially outermost belt layer and that the end portions of the radially innermost layer of width $L_1$ are provided with bands of textile cords of which the width is between 10 and 30% (preferably between 15 and 25% of the width $L_4$ of the layer of textile cords and of which the outer lateral edges are separated by a distance $L_3$ such that $L_2 < L_3 \leq L_4$ if $L_1 > L_2$ and $L_1 < L_3 \leq L_4$ if $L_2 \geq L_1$ respectively.

In a preferred embodiment the present invention is characterized in that the belt is comprised of two cut belt plies, that is layers, with axial widths of $L_1$ and $L_2$ ($L_1$ being the width of the radially innermost belt ply and $L_2$ being the width of the radially outermost belt ply), the belt being covered over its entire width by a layer of textile cords with an axial width $L_4$ such that $L_4 \geq L_1$ if $L_1 > L_2$ and $L_4 \geq L_2$ if $L_2 \geq L_1$ respectively and in that each of the end portions of the belt ply nearer the carcass (i.e., the radially inner belt) are provided with a band of textile cords located radially outward thereof and radially inward of the inwardly outward belt, the width of the bands being between 10 and 30% (preferably 15 to 25%) of $L_4$, the outer lateral edges of the two textile bands being separated by a distance $L_3$ such that $L_2 < L_3 \leq L_4$ if $L_1 > L_2$ and $L_1 < L_3 \leq L_4$ if $L_2 \geq L_1$ respectively.

Radial tires with such a belt package possess good performance and durability characteristics both at high speed and at low speed.

The invention will now be illustrated and described with the aid of the attached drawings.

Figure 1:
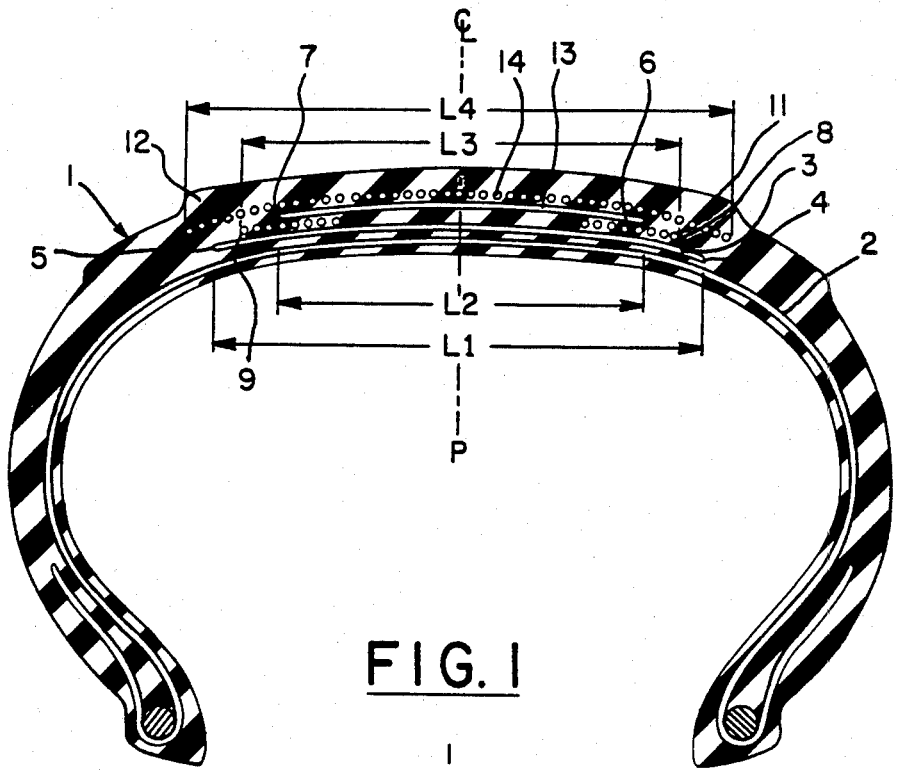
FIG. 1 is a view in cross section of a tire comprising a belt package according to the present invention.

In FIG. 1 a tire 1 is illustrated which comprises a carcass 2 of the radial type, i.e., comprising a carcass the cords of which form an angle of from 70° to 90° with respect to the circumferential direction of the tire 1. In FIG. 1 the carcass 2 contains a single ply. However, the carcass of tires of the present invention can contain more than one ply. A first layer of the belt 3 which extends over the entire circumference of the tire 1 is arranged above the carcass 2 in the region of the crown of the tire. The cords of the layer 3 form an angle of between 15° and 35° with respect to the circumferential direction of the tire. The layer 3 extends over the entire width of the tread and its edges 4, 5 are arranged in the regions of the shoulders 11, 12. The layer 3 is of width $L_1$.

The belt package comprises, in addition, bands of textile cords 6, 7 which are arranged near the edges 4, 5 of the layer 3 and radially outside this layer with respect to the axis of the tire. The width of these bands is between 10 and 30% of the width $L_4$ of an overlay 14. The orientation of the textile cords of the bands is such that they form a very small angle with the circumferential direction of the tire. This angle is between 0° and 10° and is preferably 0°.

Instead of forming a fabric of cords, that is with a weft having very low resistance, the bands of textile cords 6, 7 can also form a square woven fabric composed of reinforcement cords intersecting at right angles. The warp and weft cords can be identical or composed of cords of a first material, oriented in one direction, and of cords of a second material, oriented in the other direction. The cords can be inclined with respect to the circumferential direction of the tire. If the warp and weft cords are not identical, the cords with the higher resistance preferably form a very small angle with respect to the circumferential direction of the tire. This angle is between 0° and 10° and is preferably 0°.

The belt also comprises a layer 13 which extends over the entire circumference of the tire in the region of its crown. The figure illustrates the case where the width $L_2$ of this layer 13 is slightly less than the width $L_1$ of the layer 3 in order to avoid the edges of the layers being superposed in the regions of the shoulders 11, 12 of the tire. The cords which compose the layer 13 are generally oriented at an angle of between 15° and 35° with respect to the circumferential tread center line. The cords of the layer 13 are orientated such that the angle which they form with the circumferential direction is opposite to that formed by the cords of the layer 3, the cords of belt ply 3 being at an angle essentially the same as the cords of belt ply 13 to the circumferential tread center line. Finally, the belt comprises a layer 14 of textile cords which extends over the entire width of the belt, but only needs to be as wide as the radially outermost belt ply 13, even when the width $L_2$ of belt ply 13 is less than the width $L_1$ of the radially innermost belt ply 3. The width $L_4$ of this layer is such that it is equal or slightly greater than the width $L_1$ of the layer 3, although, again, layer 14 can be as wide as ply 13. The orientation of the cords of the layer 14 is such that they form a very small angle with the circumferential direction. This angle is between 0° and 10° and is preferably 0°.

Figure 2:
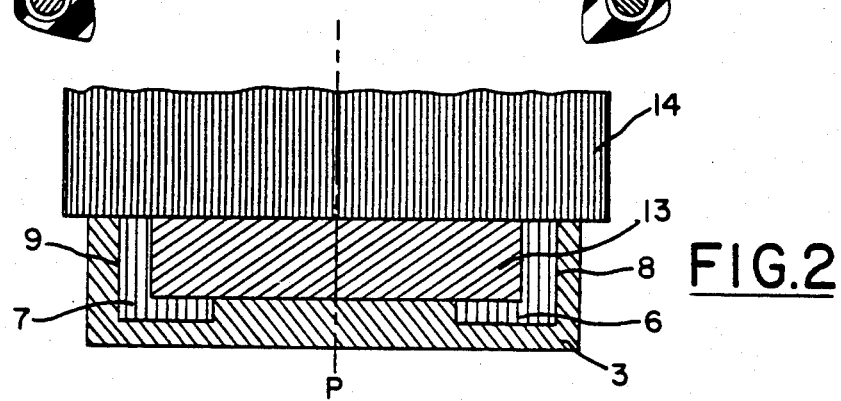
FIG. 2 is a partial plan view of the belt package.

FIG. 2, which is a partial plan view of the belt package according to the invention, shows the relative position of the layers of the belt as well as the orientation of the cords which comprise the layers.

Figure 3:
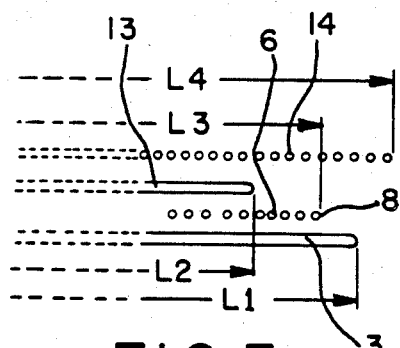
FIGS. 3 and 4 are diagrammatic views of two particular embodiments of the belt package.
Figure 4:
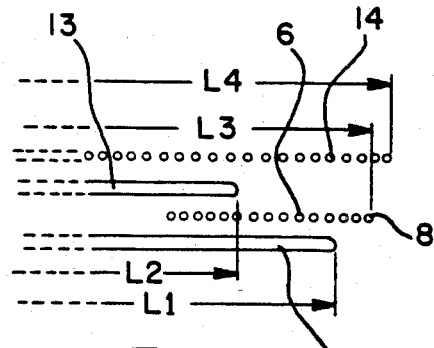

In FIGS. 3 and 4, two particular embodiments of the invention are illustrated.

FIG. 3 illustrates a construction where $L_1 > L_3 > L_2$, i.e. the case where the outer lateral edges 8, 9 of the bands are located in the space which separates the edges of the layers 3 and 13. As a result the distance which separates the edges 8, 9 is always a value between the values of the widths $L_1$ and $L_2$ of the layers 3 and 13.

It is also suitable to place the textile bands as indicated in FIG. 4 which shows the case where $L_1 \leq L_3 \leq L_4$ (with $L_1 > L_2$), that is the case where the textile bands project slightly beyond the edges of the layer 3 while remaining covered over their entire width by the textile layer 14.

The belt plies are comprised of any conventional type of cords such as steel, aramid and fiberglass, but are not limited thereto.

The textile layer and textile bands which are generally used to reinforce tires are comprised of filaments or cords which have a high tensile strength, such as, but not limited to, polyamide and polyester cords.

Nylon cords are particularly suitable for use in the textile cord layer and the textile bands.

The invention has been illustrated with the aid of a tire belt with two layers, the width of the layer nearer the carcass being greater than the width of the layer nearer the tread. The present invention is not limited to this embodiment, also applying to the case where the width of the layer nearer the carcass is greater or equal to the width of the layer nearer the tread.

Likewise the invention is not limited to the use of a single layer of textile cords or a single layer of textile bands, but also applies to tires which contain more than one layer of textile cords and/or textile bands, e.g., two layers or more, for example where a textile strip is wound more than once around the tire upon itself.

While certain representative embodiments and details have been shown for the purpose of illustrating the invention, it will be apparent to those skilled in this art that various changes and modifications can be made therein without departing from the spirit or scope of the invention.

We claim:

1. A tire with radial carcass, a ground engaging tread, a reinforcing belt structure disposed between the carcass and said tread, said reinforcing belt structure comprising a radially outwardly disposed belt layer and a radially innermost belt layer of filaments or cords having a width $L_2$ and a width $L_1$ respectively, the filaments or cords of each of said belt layers forming an angle of 15°–35° with respect to the circumferential direction of the tire, characterized in that the reinforcing belt structure is covered by a first layer of textile cords of axial width $L_4$ which is at least equal to the width $L_2$ of the radially outermost belt layer and that the end portions of the radially innermost belt layer have disposed radially outward thereof a second layer of textile cords comprising two axially spaced bands each having a width between 10 and 30% of the width $L_4$ of said first layer of textile cords, the outer lateral edges of said second layer of textile cords being spaced apart a distance $L_3$ such that $L_3$ is comprised between the width of the narrowest and the width of the widest belt layer of said reinforcing belt structure, the filaments or cords of said first and second layers of textile cords being disposed such that they form an angle of between 0° and 10° with respect to the circumferential direction of the tire.

2. The tire according to claim 1 characterized in that $L_4$ is equal to or greater than the width of the widest belt of said belt reinforcing layers.

3. The tire according to claim 1 wherein the bands of said second layers of textile cords have a width from 15 to 25% of the width $L_4$ of the textile layer.

4. A tire according to claim 1 characterized in that the bands of said second layer of textile cords and the first layer of textile cords are comprised of nylon.

* * * * *

UNITED STATES PATENT AND TRADEMARK OFFICE
CERTIFICATE OF CORRECTION

PATENT NO. : 4,498,514
DATED : Feb. 12, 1985
INVENTOR(S) : Antonnis G. Maathuis, et al.

It is certified that error appears in the above—identified patent and that said Letters Patent are hereby corrected as shown below:

In col. 1 line 38 the word "inwardly" should read --radially--.

Signed and Sealed this

Thirteenth Day of August 1985

[SEAL]

Attest:

DONALD J. QUIGG

*Attesting Officer*   *Acting Commissioner of Patents and Trademarks*